No Printed Specification Available
2143X
L. Dudley.
Making Farm Implements.
Patented May 27, 1814.
Side View
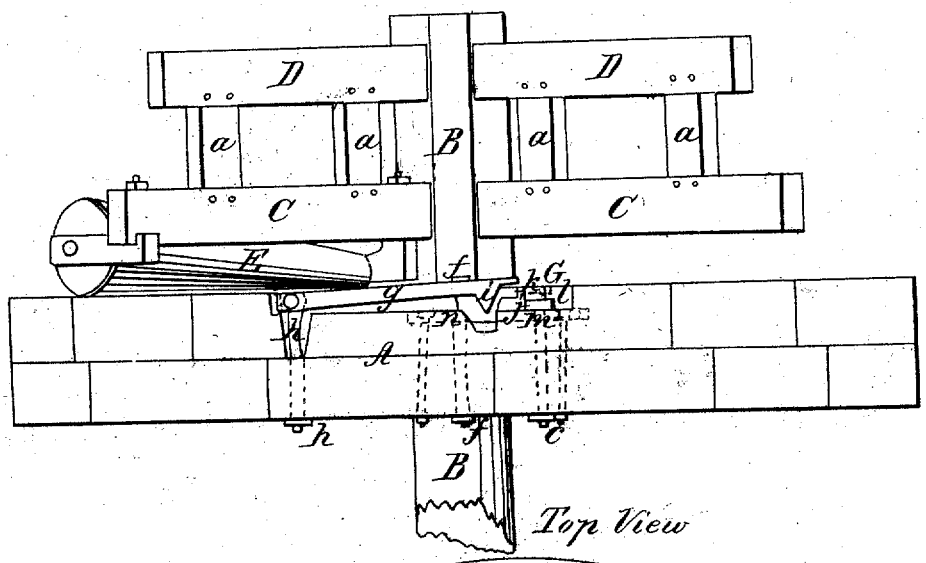
Top View
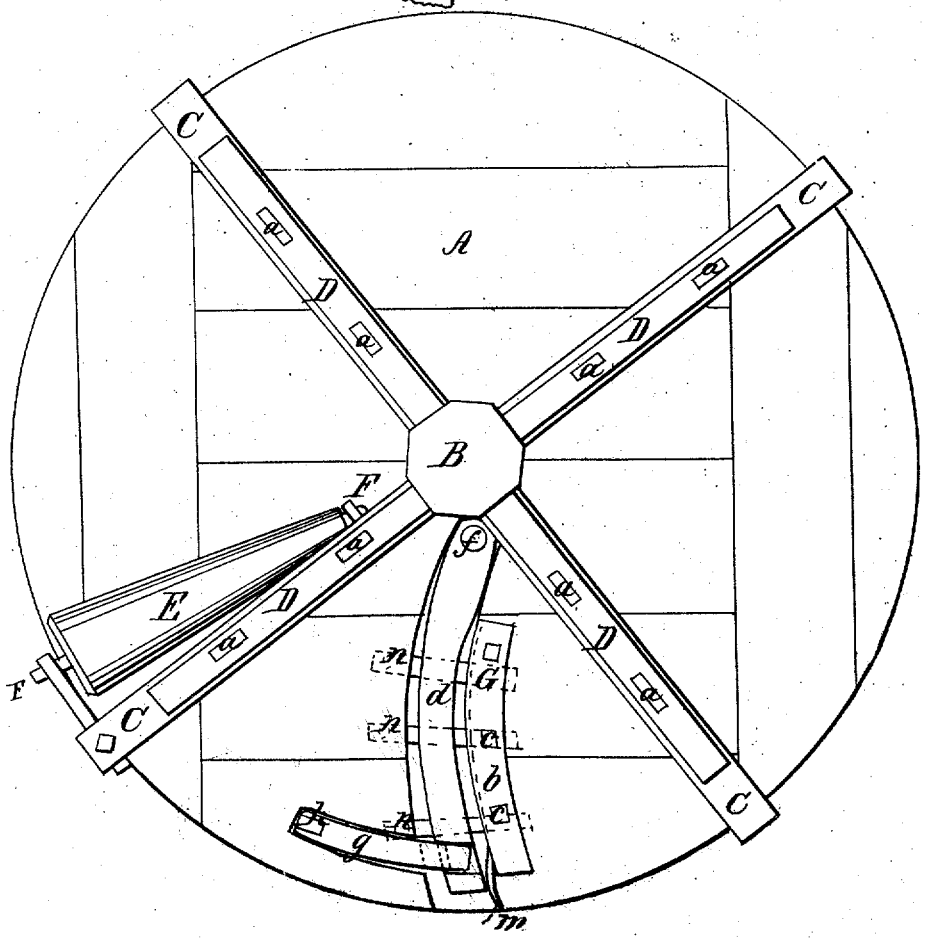

May 27. 1814 2143X

Luther Dudley
Letters Patent

The Schedule referred to in these Letters Patent and making part of the same containing a description in
the words of the said Luther Dudley himself of his improvement in the manufacture of Scythes The invention of this improvement in the manufacturing of Scythes being a machine to turn the
back of the Scythe and to crook it in a curvilinear form at one operation of the machine and at
one heat consists in constructing and combining the following parts and principles of machinery here
described. Viz a platform of hard timber is made of a suitable height. its top surface is horizontal &
its shape is circular forming a part of a circle or a whole circle as may be wanted. Through the centre
of this horizontal circular platform or bed a large perpendicular shaft is put which turns round from
left to right. A little above the surface of the platform two strong arms of hard timber are
put through the shaft at right angles with each other and extend horizontally from the shaft
about four feet. being well braced with each other and with timbers from other arms several
feet above, put through the perpendicular shaft similar to the lower arms and for the purpose
of securing and supporting said lower arms. To the underside of one of said lower arms and in
the same direction with it, is fixed upon its gudgeon a large conical cast iron roller weighing about
eight hundred. turned perfectly true being about four feet long. and its diameter at its large end
is twelve inches and its small one about four inches. This conical roller must be hung by its gudg-
eons, under said horizontal arms of said perpendicular shaft pointing with its small end to the
centre of the shaft. so that the under surface of said Roller may fit the horizontal surface of
said platform on which it rolls round as said shaft turns. The conical shape of this roller must
be such that it may roll equally alike at both of its ends. And the large end describing a circle
as much larger than the small end. as twice the length of the said conical roller. the proportion
between the diameters of the two ends of this conical roller. may be easily found by knowing the
diameters of the circles those two ends describe on said horizontal platform. Upon said horizontal
platform (which may be a complete circle or any convenient portion of it round said perpendicular
shaft) and even with the surface of said platform are fixed one or more curvilinear griping
vices. curving a little to the right and pointing to the centre of said perpendicular shaft or near-
ly so. The jaws of this curvilinear griping vice are made of large bars of iron faced with steel
& tempered. The curvature of the jaws is the same as the scythe and their thickness is equal to the
width of the back of the scythe to be turned up. The right hand jaw is permanently bolted to the
The opposing jaw has its end next to the shaft secured to said platform
said platform by a joint bolt, & its outer end is pressed up to the other jaw horizontally so as to gripe the back of the sythe plate firmly by a strong iron latch. This latch is about eighteen inches long & has a strong and very powerful spring for its bolt or gudgeon so that [illegible] plate should be a little thicker than common. this spring will yield and allow the latch to be drawn down to its place the end of this latch extending to the right has on its under part a curved angle which acts against the outer end of the said moving jaw. so that when said latch is crowded down by the approach of said ~~roller~~ said moving jaw is closed or forced up to the upper jaw and gripes the back of the sythe firmly. said roller then moving onward to the right comes against the sythe plate which is now perpendicular viz edge upward as griped in said curve jaws and instantly bends down all at once the sythe plate, and rolls on over it compressing it firmly upon the surface of the permanent jaw of said vice. the length of which jaw must be such as to leave the point of the sythe without turning up a back. As soon as the roller passes over the sythe plate a spring fixed to the outer end of said moving jaw: opens it and the workman then takes the sythe plate out. which is then to be finished with the hammer in the usual manner. It is best to have a proper furnace in which to heat a large number of sythe plates at a time to a moderate red heat. and to preserve this degree of heat while the machine is in operation. It is also contemplated to make the roller a perfect cylinder. Viz. the diameter of its ends the same. and to have it fixed in the rim or extended arms of a wheel whose shaft or axis lies horizontally over the said platform. so that said roller will be moved over the platform to the right and produce the same effect by the revolving of said wheel. this mode of giving motion to a roller to produce the effect required of this machine will answer very well for a small factory. Another mode of putting in motion said roller last mentioned is by having it hung by its gudgeon in a perpendicular frame formed by two timbers about fifteen feet long. or so. & [illegible] at their upper ends so as to allow the roller to be rolled back & forth on the plat form and when it comes to the sythe plate in said curved griping vice. said frame will then give a proper degree of pressure to the roller. This vibratory motion of the frame to roll the roller forward and back again may be obtained by an horizontal arm connected to this roller furnace and ~~connecting~~ extending to the shaft of the common water wheel. by which the proper motion may be given to said horizontal arm. by two ~~cams~~ or excentricities on said water wheel shaft. one of which cams will roll the roller forward over the griping vice and the other will roll it back instantly. where it will stop a short time and admit the sythe plate to be put into said griping vice which is the same in all these different ways contemplated to be put in operation. The platform in these two last modes of giving motion to the said Roller will be very simple and admit of but one griping vice. This cylindrical ~~cast~~ iron roller for these

[illegible] best modes of applying it for the purpose aforesaid may be about eight inches in diameter The use of this machine saves much time in making sythes. It is to be noted that the moving jaw of the griping vice has two or more cross pieces of iron bolted on the under side and let into the platform, as well under the permanent jaw as back side of said moving jaw, so as to prevent said moving jaw from moving up or from being bent up above the horizontal surface of the platform, and when the sithe plate is put into said griping vice edge upwards its back rests upon said cross pieces as the [illegible] gauge of the height of the back of the sithe which must be straight when put into said vice to have its back turned. The permanent jaw of the griping vice must be no longer than the back of the sythe that is to be turned. and for sithes of different lengths it is best to have permanent jaws also of different lengths accordingly to be put in and taken out. & all to fit the said moving jaw especially in machines that have but one griping vice Witnesses
John Fairbanks
Moses L. Morse.

Luther Dudley

Drawing made
A. A. [illegible]

(1368 words)